(12) United States Patent
Ollila et al.

(10) Patent No.: US 10,362,231 B2
(45) Date of Patent: Jul. 23, 2019

(54) HEAD DOWN WARNING SYSTEM

(71) Applicants: Mikko Ollila, Tampere (FI); David Isherwood, Tampere (FI)

(72) Inventors: Mikko Ollila, Tampere (FI); David Isherwood, Tampere (FI)

(73) Assignee: Intel Corporation, Santa Clara, CA (US)

( * ) Notice: Subject to any disclaimer, the term of this patent is extended or adjusted under 35 U.S.C. 154(b) by 361 days.

(21) Appl. No.: 15/200,602

(22) Filed: Jul. 1, 2016

(65) Prior Publication Data

US 2018/0007276 A1    Jan. 4, 2018

(51) Int. Cl.
| | |
|---|---|
| *H04N 7/18* | (2006.01) |
| *H04N 5/232* | (2006.01) |
| *G08B 21/02* | (2006.01) |
| *G01C 3/08* | (2006.01) |
| *G08B 5/36* | (2006.01) |
| *H04M 1/725* | (2006.01) |

(52) U.S. Cl.
CPC ........... *H04N 5/23293* (2013.01); *G01C 3/08* (2013.01); *G08B 21/02* (2013.01); *H04N 7/18* (2013.01); *G08B 5/36* (2013.01); *H04M 1/72522* (2013.01); *H04N 5/23238* (2013.01); *H04N 5/23245* (2013.01)

(58) Field of Classification Search
CPC ...................... H04N 5/23238; H04N 13/0271
USPC .................................................. 348/141–161
See application file for complete search history.

(56) References Cited

U.S. PATENT DOCUMENTS

| | | | |
|---|---|---|---|
| 9,686,466 B1 * | 6/2017 | Billinghurst | H04N 5/23238 |
| 2014/0071234 A1 * | 3/2014 | Millett | G01S 17/89 |
| | | | 348/43 |

* cited by examiner

*Primary Examiner* — Anand S Rao
(74) *Attorney, Agent, or Firm* — International IP Law Group, P.L.L.C.

(57) ABSTRACT

Techniques for implementing a head down warning system in a handheld electronic device are described. An example of a device includes a display and a depth detection unit disposed on a surface of the handheld electronic device opposite the display. The depth detection unit includes a pair of cameras with panoramic lenses. The device also includes one or more processors that receive distance information from the depth detection unit, process the distance information to detect a hazard, and render a warning on the display to alert a user of the handheld electronic device about the hazard.

25 Claims, 5 Drawing Sheets

HEAD DOWN WARNING SYSTEM

TECHNICAL FIELD

The present disclosure relates generally to a warning system for a handheld electronic device. The disclosure includes techniques for processing an image to be used in such a warning system.

BACKGROUND ART

Smartphones have become a ubiquitous source of information, entertainment, and communication for many people. It is not uncommon for a person to surf the internet, watch videos, text, or play games on their smartphone or other handheld device while walking. The user might have some peripheral vision but, with their head pointed down at the display there's still opportunity for the person to walk into obstacles or other people.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The subject matter disclosed herein relates to a head down warning system. The head down warning system is configured to warn a person about potential obstacles when walking while using a cell phone or other handheld device. The person's environment may be monitored by a world-facing camera on the opposite side of the device from the display screen. Warning messages can be displayed to the user on the display screen if the user appears likely to collide with an obstacle or other person.

The person using the handheld device while walking will generally be holding the device at an angle comfortable for viewing of the device's display screen. This means that the world-facing camera will be angled toward the ground and may not have a good view of the environment directly in front of the user. The head down warning system described herein uses one or more panoramic lenses for imaging the environment directly in front of the user. As used herein, the term panoramic lens refers to a lens with a wide field of view close to 180 degrees. For example, a panoramic lens may have a field of view greater than 170 degrees. In some examples, the warning system uses a type of panoramic lens referred herein as a "panamorphic" lens. A panamorphic lens is a lens with a wide field of view and a non-linear magnification profile. Panoramic objective lens has a distribution function of the image points that is not linear relative to field angle of the objects points of the panorama, such that at least one zone of the image obtained is expanded while at least another zone of the image is compressed. For example, a panamorphic lens may have increased magnification at the outer edges of the field of view compared to a linear panoramic lens. The use of panamorphic lenses enables the head down warning system to obtain better resolution of images of the environment directly in front of the user when the device is angled toward the ground. Various examples of the present techniques are described further below with reference to the Figures.

Figure 1:
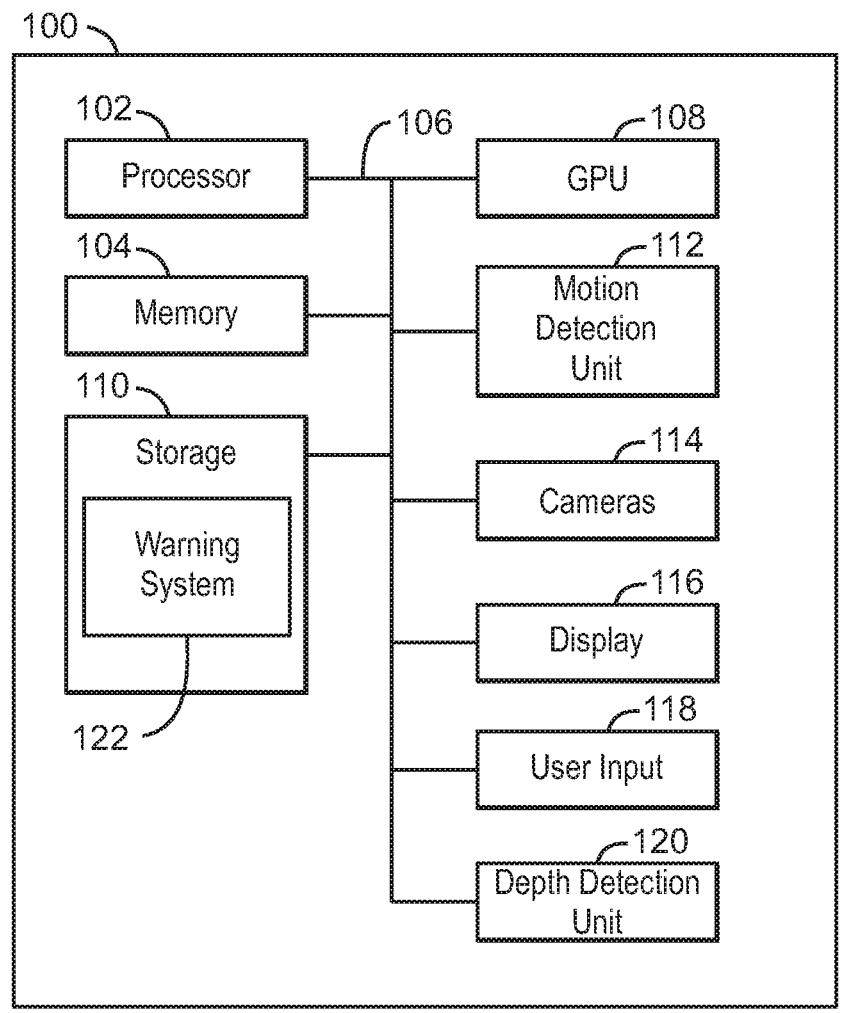
FIG. 1 is a block diagram of a computing device with a head down warning system.

FIG. 1 is a block diagram of an electronic device with a head down warning system. The electronic device 100 may be, for example, a tablet computer, mobile phone, or smart phone, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 may also include a graphics processing unit (GPU) 108. As shown, the CPU 102 may be coupled through the bus 106 to the GPU 108. The GPU 108 may be configured to perform any number of graphics operations within the electronic device 100. For example, the GPU 108 may be configured to render or manipulate graphics images, graphics frames, videos, or the like, to be displayed to a user of the electronic device 100.

The electronic device 100 can also include a storage device 110. The storage device 110 is a non-volatile physical memory such as a hard drive, an optical drive, a flash drive, an array of drives, or any combinations thereof. The storage device 110 can store user data, such as audio files, video files, audio/video files, and picture files, among others. The storage device 110 can also store programming code such as device drivers, software applications, operating systems, and the like. The programming code stored to the storage device 110 may be executed by the CPU 102, GPU 108, or any other processors that may be included in the electronic device 100.

The electronic device 100 can also include a motion detection unit 112 comprising hardware such as an accelerometer, a gyroscope, a Global Positioning System (GPS) hardware module, or some combination thereof. The motion detection unit 112 can be configured to detect movement of the electronic device 100 and/or an orientation of the electronic device 100 with respect to the external environment. For example, the motion detection unit 112 can be used to determine whether the user of the device is walking and an angle at which the user is holding the device.

The electronic device 100 also includes one or more cameras 114 that may be used for capturing still pictures or video. In some examples, the electronic device 100 includes a user-facing camera (same side as display screen) and a world-facing camera (opposite side from the display screen).

The electronic device 100 can also include a display 116 and one or more user input devices 118, such as switches, buttons, a keyboard, a mouse, or trackball, among others. One of the input devices 118 may be a touchscreen, which may be integrated with the display 116.

The electronic device 100 also includes a depth detection unit 120. The depth detection unit 120 is used to capture distance information associated with object in the user's environment. For example, the depth detection unit 120 can include a stereo pair of cameras that provide images that can be processed to determine the distance of objects within the captured images. The depth detection unit 120 includes two or more panoramic lenses, which may also be panamorphic lenses. Features of the lenses used in the depth detection unit 120 are explained further below in relation to FIGS. 2-4.

The programming code stored to the storage device 112 may include a warning system 122. In some examples, rather than being implemented as programming code stored to the storage device 112, the warning system 122 may be implemented as firmware or logic circuits included in one or more dedicated processors such as an Application Specific Integrated Circuit (ASIC), a Field Programmable Gate Array (FPGA), a System on a Chip (SOC), and combinations thereof.

The warning system 122 is used to alert the device user of hazards such as other people, objects, walls, stairways, curbs, roadways, or ledges, for example. The warning system 122 uses the depth detection unit 120 and motion sensing to determine whether a collision with an object or encounter with some other type of hazard is likely and provide an alert to the user through the display 116. The warning system 122 may be activated based on movement detected by the motion detection unit 112. If no movement is detected, the warning system 122 can be deactivated.

While active, the warning system 122 receives data receive from the depth detection unit 120 and processes the data to generate a depth image. The warning system 122 can estimate the size of existing or new objects in the depth image and use the rate of change in object size as an estimate of whether the objects are an obstacle risk. If a particular object of interest does present an obstacle risk, the user is alerted. The alert may be rendered using a variety of visual cues rendered on the display 116. For example, the alert may be rendered by overlaying an image of the object of interest over the subject matter already being displayed. The image of the object may be in outline form, a shaded image, and others. The image may be rendered in a constant color or as a chroma inversion of the currently presented image on the display. The image may also be solid or semi-transparent.

The block diagram of FIG. 1 is not intended to indicate that the electronic device 100 is to include all of the components shown in FIG. 1. Rather, the computing system 100 can include fewer or additional components not shown in FIG. 1, depending on the details of the specific implementation. Furthermore, any of the functionalities of the CPU 102, the graphics processor 108, or the audio processor 110, may be partially, or entirely, implemented in hardware and/or in a processor. For example, the functionality may be implemented in any combination of Application Specific Integrated Circuits (ASICs), Field Programmable Gate Arrays (FPGAs), logic circuits, and the like.

Figure 2:
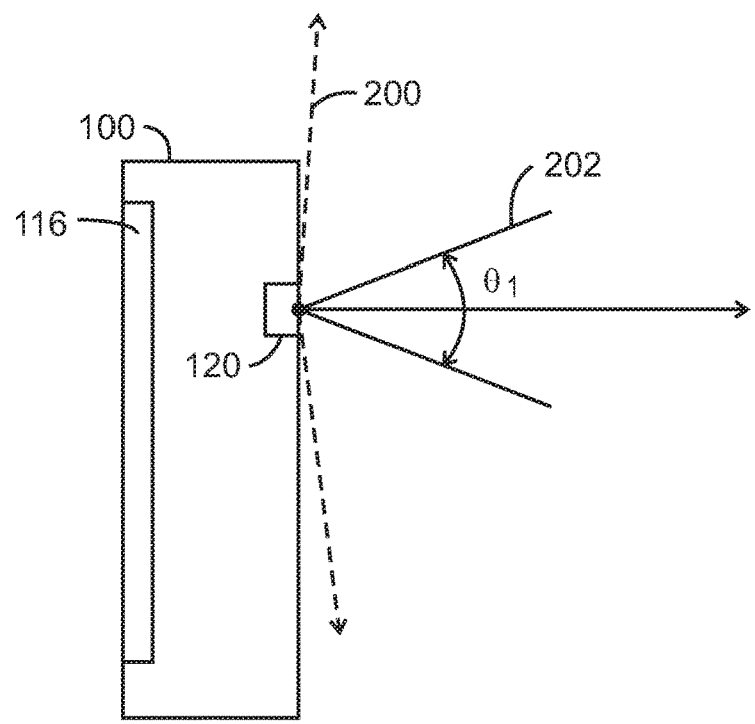
FIG. 2 is an example of an electronic device in stationary mode.

FIG. 2 is an example of an electronic device in stationary mode. The electronic device 100 includes the display 116 and the depth camera 120. The depth camera 120 may be disposed in any suitable location on the world-facing side of the electronic device 100. The field of view of the depth camera 120 is shown with dotted lines 200 and the field of interest is shown with solid lines 202 and characterized by a range of angles, $\ominus_1$. The field of interest is the portion of the field of view that will be processed for depth finding purposes. The stationary mode shown in FIG. 2 may be activated by sensing that the user is not walking. In this mode, the warning system is disabled and the field of interest is selected to be in a direction normal to the surface of the electronic device 100 opposite the display. This field of interest is likely to be more suitable for use when the user is stationary. For example, the user may be taking a picture with the electronic device 100 and will expect the field of interest to be normal to the electronic device 100. The range of angles, $\ominus_1$, may also be selected to match the field of the view of the world-facing camera 114 shown in FIG. 1. This enables depth information to be captured for images received by the camera 114, such as pictures taken by the user.

Figure 3:
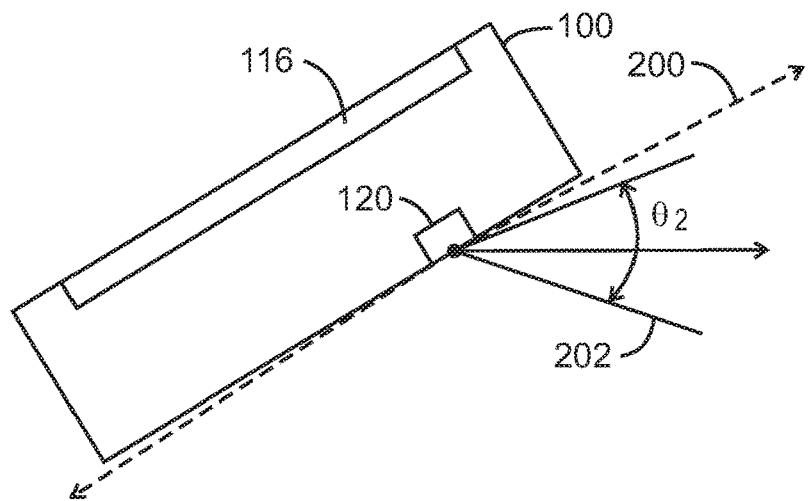
FIG. 3 is an example of an electronic device in walking mode.

FIG. 3 is an example of an electronic device in walking mode. In this mode, the user is walking with the device and may be still viewing the display while walking. During walking mode, the warning system is active and is processing the images from the depth camera 120 to identify potential obstacles as described above. In walking mode, the field of interest is adjusted to a different range of angles, $\ominus_2$. Adjusting the field of interest provides compensation for the tilt of the electronic device 100 and maintains the field of interest in a forward-looking direction. The range of angles, $\ominus_2$, may be preselected based on a likely angle at which the electronic device 100 will be held by a user when walking. In some examples, the tilt angle of the electronic device 100 may be sensed and the range of angles, $\ominus_2$, selected accordingly to maintain the field of interest in the forward looking direction. The range of angles, $\ominus_2$, can also be selected to account for whether the display 116 is oriented in a portrait mode or landscape mode.

Figure 4:
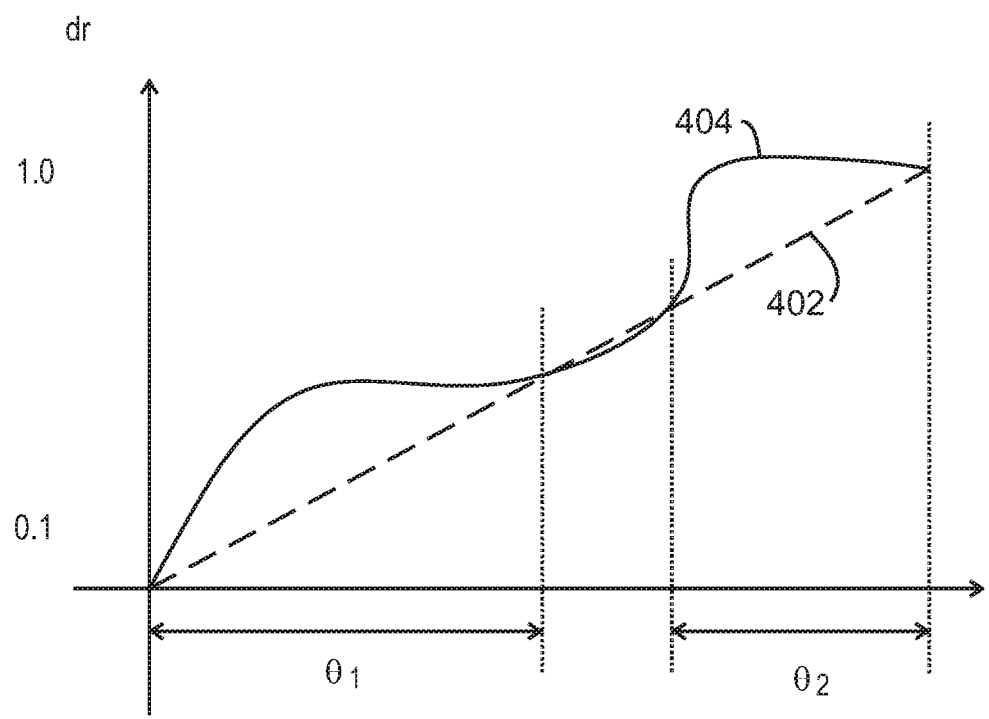
FIG. 4 is a graph showing an image point distribution function of a panamorphic lens that may be used in the depth camera.

FIG. 4 is a graph showing an image point distribution function of a panamorphic lens that may be used in the depth camera. As explained above, the depth camera 120 will use panoramic lenses that have a wide field of view, such as "fisheye" lenses. Fisheye lenses tend to have low image resolution at the edge of its field of view, above 120 degrees for example. To achieve greater resolution at the edges of the captured image, the depth camera can be equipped with panamorphic lenses. The distortion of the panamorphic lens can be modified so that the image at the edge of the field of view covers more pixels. The desired distortion can be achieved by shaping the panamorphic lens to provide more image magnification at the edge of the field of view compared to a normal fisheye lens.

The image point distribution function of FIG. 4 shows the magnification characteristics of an example panamorphic lens that can be used in the depth camera. The X-axis represents the field angle from the center point of the lens field of view, where zero represents the center point. The Y-axis represents the relative distance, dr, of an image point from the center of the image. The relative distance is between 0 and 1 and is equal to the distance of the image point relative to the center of the image divided by the radius of the image.

The image point distribution function of a typical fisheye lens is shown by dotted line 402 and the image point distribution function for the panamorphic lens is shown by curve 404. As shown in FIG. 4, the image point distribution function of the panamorphic lens is not linear. Areas where the curve 404 is below the line 402 represent areas of image compression, while areas where the curve 404 is above the line 402 represent areas of image expansion. The image point distribution of the panamorphic lens results in image expansion within the two potential fields of interest $\Theta_1$ (corresponding to stationary mode) and $\Theta_2$ (corresponding to walking mode). Accordingly, the example lens characteristics shown in FIG. 4 will provide suitable image resolution for both still image uses and for the warning system.

Figure 5:
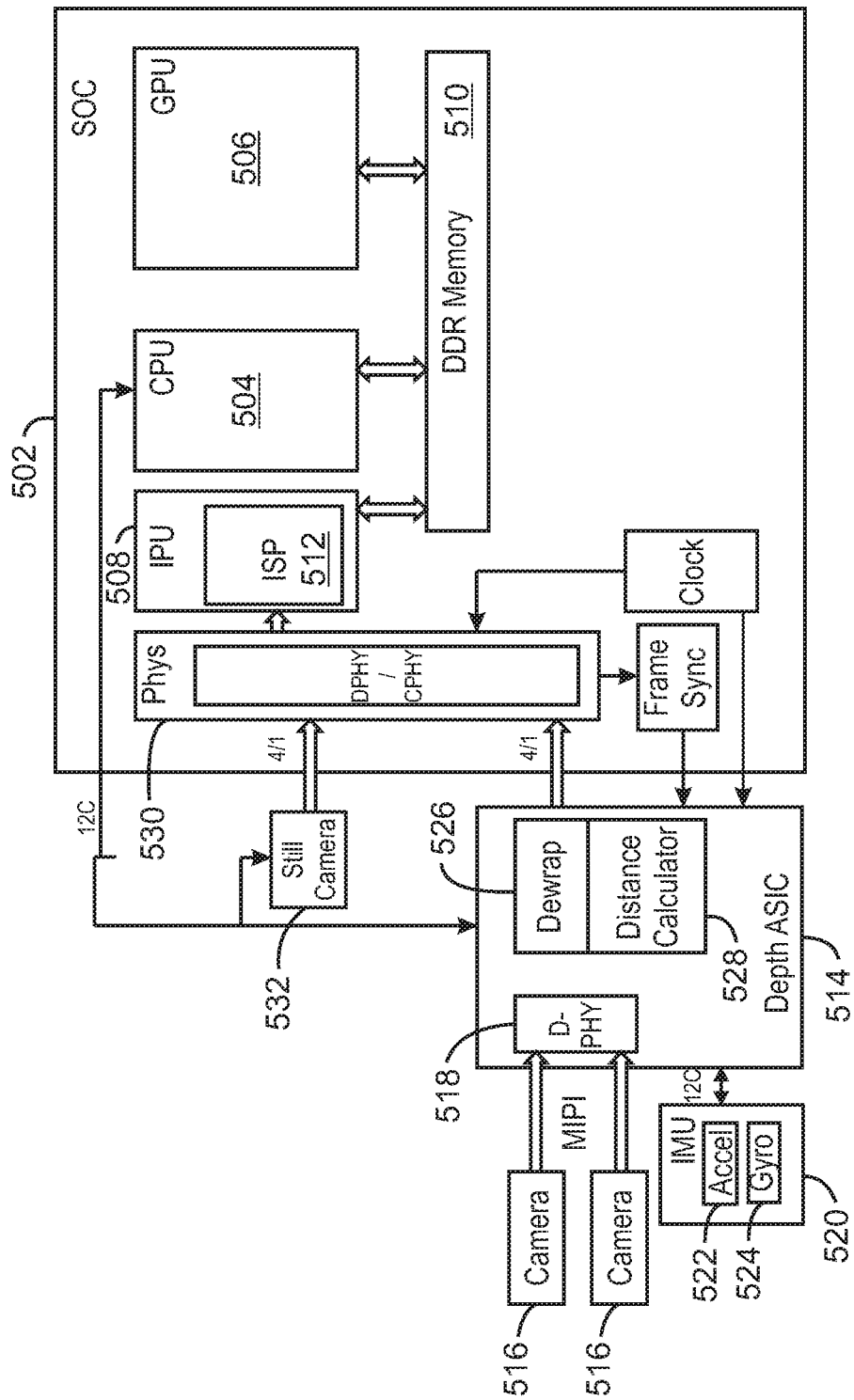
FIG. 5 is a block diagram of an example system for implementing a head down warning system in an electronic device.

FIG. 5 is a block diagram of an example system for implementing a head down warning system in an electronic device. The example system 500 includes a System-On-a-Chip (SOC) 502 that handles most of the basic functions of the electronic device. The SOC 502 is a single integrated circuit chip that includes a CPU 504, a GPU 506, an image processing unit (IPU) 508, and a Double Data Rate (DDR) memory 510. The CPU 504 runs the operating system of the device and may run various software applications. The GPU 506 processes various graphics calculations for rendering image data to a display. The image processing unit 508 processes captured images and may have one or several parallel vector processors. It access the image data stream, switches it into memory, and directs it to different blocks or bypass certain functions. The image processing unit 508 controls the input and output streams of images and settings and timings of the hardware acceleration blocks also knows as ISP. ISP frees the vector processors of the image processing unit 508 to support high quality noise reduction, HDR processing or other computer vision related tasks. For example, it collects the autofocus statistics and performs auto focus, auto exposure, and auto white balance, so called 3A functions (AE, AF, AWB). The image processing unit 508 can also convert the output format of the system, for example, RGB to YUV conversion. The image processing unit 508 includes an Image Signal Processor (ISP) 512 which is a specialized digital signal processor with a hardware accelerated imaging pipeline. Typical functions of this block are geometrical distortion correction (GDC) and lens shading correction (LSC). The DDR memory 510 is a working memory that is used by the CPU 504, GPU 506, and image processing unit 508 to perform the various processing tasks.

In this example, depth calculations are performed by a separate Application Specific Integrated Circuit (ASIC), referred to herein as the depth ASIC 514. The depth ASIC 514 is coupled to depth cameras 516, which have panoramic and optionally panamorphic lenses. The depth cameras 516 may be communicatively coupled to the depth ASIC 514 through a Mobile Industry Processor Interface (MIPI) bus to a D-PHY port 518 of the Depth ASIC 514. The Depth ASIC 514 receives image data from the depth cameras 516 and processes the images to estimate the distance for each pixel within the field of interest.

The depth ASIC 514 is also coupled to an Integrated Motion Unit (IMU) 520 which can include an accelerometer 522, a gyroscope 524, or both. The Integrated Motion Unit 520 can be coupled to the Depth ASIC 514 through an I2C bus, for example. The Integrated Motion Unit 520 triggers the depth ASIC 514 to enter stationary mode or walking mode based on whether motion is the detected that indicates that the user is walking. The selection of the active mode determines the field of interest for the depth ASIC 514. Those portions of the images captured by the depth cameras 516 that are outside of the field of interest can be discarded. Activation of stationary mode causes the selected field of interest to be normal to the surface of the electronic device opposite the display. Activation of the walking mode causes the selected field of interest to be shifted toward the edge of the field of view so that the field of interest is forward-looking.

The depth ASIC 514 can include a dewarping module 526 and a distance calculator 528. As explained above, the lenses used on the depth cameras 516 will tend to deform the captured images. The dewarping module 526 can implement a dewarping function that flattens the image by computationally reversing the deformation introduced by the lens so that objects in the image appear normal. The dewarping function may be a known function that is determined based on the magnification profile of the lenses.

After the images are dewarped, the two images are processed by the distance calculator 528 to estimate the distance for each image pixel. The result of the processing may be a depth map that describes the distance of each pixel in the captured images. The dewarped images and/or the depth map can be sent from the Depth ASIC 514 to the SOC 502 through a port shown in FIG. 5 as the physical layer (Phys) 530. In some examples, the physical layer 530 includes hardware and firmware defined by MIPI alliance for D-PHY and/or C-PHY busses.

The SOC 502 may also be coupled to a still camera which also captures images and the sends the captured images to the SOC 502 through the physical layer 530. During stationary mode, the user can use the depth ASIC 514 in combination with the still camera 532. For example, the user may be able to take photographs using the still camera 532 in stationary mode, and the images received from the still camera 532 may be processed by the IPU 508 to add depth information to the captured image based on the depth map received from the depth ASIC 514. The SOC 502 can also include a clock generator 534 and a frame synchronization block 536 used to synchronize the depth camera exposures and the still camera exposures.

During walking mode, the SOC 502 may be programmed to implement the head down warning system based on the images received from the depth ASIC 514. The head down warning system processes the images captured by the depth ASIC 514 to determine a speed and trajectory of the objects to determine possible collision with an obstacle or other person. If a warning is triggered, the dewarped pictures provided by the depth ASIC 514 may be used to generate the visual warning indicator that is sent to the display.

The block diagram of FIG. 5 is not intended to indicate that the electronic device is to include all of the components shown in FIG. 5. Rather, the computing system can include fewer or additional components not shown in FIG. 5, depending on the details of the specific implementation.

Figure 6:
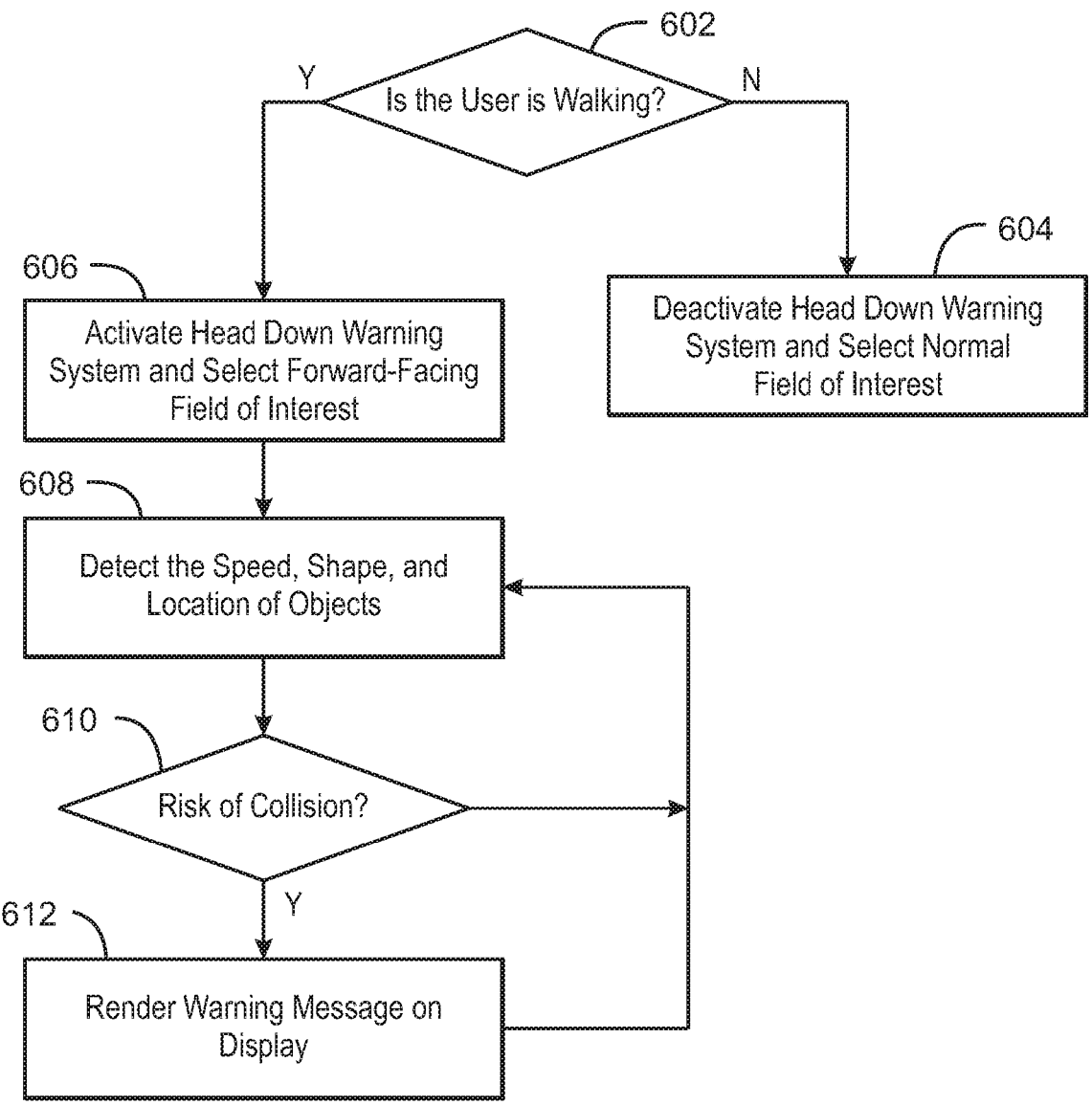
FIG. 6 is a process flow diagram of a method of implementing a head down warning system in an electronic device.

FIG. 6 is a process flow diagram of a method of implementing a head down warning system in an electronic device. The method 600 may be performed by any suitable hand-held electronic device such as a smart phone or tablet computer that includes a depth detection unit that includes a pair of depth cameras with panoramic lenses. The method may be performed by hardware or a combination of hardware and programming. Examples of devices that can be configured to perform the method 600 include the computing device 100 and the system 500. The method 600 may begin at block 602.

At block 602, a determination is made regarding whether the user is walking. This determination may be made using a motion detection device such as an accelerometer or gyroscopic sensor. If the user is not walking, the process flow advances to block 604.

At block 604, stationary mode is activated. During this mode, the head down warning system is deactivated and the field of interest of the depth cameras is selected to be normal to the surface of the electronic device that is opposite the display. This enables the depth cameras to be uses in conjunction with the devices still camera. If the user is walking, the process flow advances from block 602 to block 606.

At block 606, walking mode is activated. During this mode, the head down warning system is activated and the field of interest of the depth cameras is selected to be toward an edge of a field of view of the depth cameras and in the forward-facing direction, i.e., in the direction that the user is walking. This enables the depth cameras to be used to identify potential hazards. The field angles that represent the forward-facing direction may be determined in part based on data regarding the angle at which the device is being held. For example, the filed angles that represent the forward-facing direction will be different depending on whether the devices is being held with a portrait orientation or landscape orientation. In some examples, the tilt of the device relative to gravity may also be used to determine the range of angles used for the forward-facing field of interest.

At block 608, the images from the depth cameras are processed to identify potential hazards. The processing includes dewarping the images, processing the dewarped images to generate a depth map, and identifying objects in the images, such as people, walls, barriers, curbs, and the like. The identification of potential hazards also includes detecting, from the dewarped images, the speed, shape, and location of the objects. Analysis of the speed, shape, and location of the objects enables the warning system to determine whether a particular object is a potential threat and whether the path of the user is likely to intersect with the object, resulting in a collision.

The image processing may be performed by one processor or a combination of processors. For example, in some implementations, the dewarping, depth detection, and hazard detection processes may be performed by the same processor, such as the processor 102 (FIG. 1) or the CPU 504 (FIG. 5). In some implementations, the dewarping and depth detection may be performed by a specialized processor, such as the depth ASIC 514 (FIG. 5) while the hazard detection is performed by the CPU 504. Various other configurations are possible.

At block 610, a determination is made regarding whether an object presents a risk of collision. If no detected object presents a risk of collision, the process flow advances to block 608 and the process is repeated with updated image data. If a detected object presents a risk of collision, the process flow advances to block 612.

At block 612, a warning message is generated and rendered on the display. The warning message may take any suitable form. In some examples, the warning message includes an image of the detected object overlaid over the graphics that were being displayed to user prior to issuing the warning. The process flow may then return to block 608, and the process may be repeated with updated image data. The warning message may persist on the display for as long as the detected object continues to present a risk of collision. Additionally, if the user stops walking, the process flow may return to block 604.

EXAMPLES

Example 1 is a handheld electronic device with a head down warning system. The device includes a display and a depth detection unit disposed on a surface of the device opposite the display. The depth detection unit includes a pair of cameras with panoramic lenses. The device also includes one or more processors that receive distance information from the depth detection unit, process the distance information to detect a hazard, and render a warning on the display to alert a user of the device about the hazard.

Example 2 includes the device of example 1, including or excluding optional features. In this example, the panoramic lenses are panamorphic lenses that provide increased magnification at an edge of a field of view of each of the cameras. Optionally, a magnification profile of the panamorphic lenses provide an increased image point distribution at a center region of the field of view and the edge of the field of view compared to a linear panoramic lens.

Example 3 includes the device of any one of examples 1 to 2, including or excluding optional features. In this example, the system includes a motion detection unit that determines whether the user is walking, wherein a walking mode of the electronic device is activated when the user is walking and a stationary mode of the electronic device is activated when the user is not walking.

Example 4 includes the device of any one of examples 1 to 3, including or excluding optional features. In this example, the device includes a motion detection unit that detects whether a user of the device walking, and wherein the processor determines a field of interest for the images received from the depth detection unit based on input from the motion detection unit. Optionally, if the user is not walking, the field of interest is selected to be normal to the surface of the device opposite the display. Optionally, if the user is walking, the field of interest is selected to be toward an edge of a field of view of the pair of cameras and in a forward-facing direction.

Example 5 includes the device of any one of examples 1 to 4, including or excluding optional features. In this example, one of the one or more processors receives images from the depth detection unit and the images are used to render the warning on the display.

Example 6 includes the device of any one of examples 1 to 5, including or excluding optional features. In this example, the images are dewarped by one of the one or more processors using a dewarping function that is determined based on predetermined magnification characteristics of the lens.

Example 7 includes the device of any one of examples 1 to 6, including or excluding optional features. In this example, the handheld electronic device is a smartphone.

Example 8 is a method of implementing a head down warning system in a handheld electronic device with a display. The method includes receiving images from a pair of depth detection cameras disposed on a surface of the handheld electronic device opposite the display, wherein the pair of depth detection cameras include panoramic lenses. The method also includes processing the images to identify a hazard and rendering a warning on the display to alert a user of the handheld electronic device about the hazard.

Example 9 includes the method of example 8, including or excluding optional features. In this example, the panoramic lenses are panamorphic lenses that provide increased magnification at an edge of a field of view of each of the depth detection cameras. Optionally, a magnification profile of the panamorphic lenses provide an increased image point distribution at a center region of the field of view and the edge of the field of view compared to a linear panoramic lens.

Example 10 includes the method of any one of examples 8 to 9, including or excluding optional features. In this example, the method includes detecting whether a user of the handheld electronic device is walking, activating the head down warning system if the user is walking, and deactivating the head down warning system if the user is not walking.

Example 11 includes the method of any one of examples 8 to 10, including or excluding optional features. In this example, the method includes detecting whether a user of the handheld electronic device is walking and determining a field of interest for the images received from the depth cameras based on whether the user of the handheld electronic device is walking. Optionally, if the user is not walking, the field of interest is selected to be normal to the surface of the handheld electronic device opposite the display. Optionally, if the user is walking, the field of interest is selected to be toward an edge of a field of view of the depth cameras and in a forward-facing direction.

Example 12 includes the method of any one of examples 8 to 11, including or excluding optional features. In this example, rendering the warning on the display includes rendering the dewarped image on the display. Optionally, generating a dewarped image includes applying a dewarping function that is determined based on predetermined magnification characteristics of the lenses of the depth cameras.

Example 13 includes the method of any one of examples 8 to 12, including or excluding optional features. In this example, the handheld electronic device is a smartphone.

Example 14 is a computer-readable medium. The computer-readable medium includes instructions that direct a processor to receive images from a pair of depth detection cameras disposed on a surface of a handheld electronic device opposite a display, wherein the pair of depth detection cameras include panoramic lenses. The instructions also direct the processor to process the images to identify a hazard and render a warning on the display to alert a user of the handheld electronic device about the hazard.

Example 15 includes the computer-readable medium of example 14, including or excluding optional features. In this example, the panoramic lenses are panamorphic lenses that provide increased magnification at an edge of a field of view of each of the depth detection cameras. Optionally, a magnification profile of the panamorphic lenses provide an increased image point distribution at a center region of the field of view and the edge of the field of view compared to a linear panoramic lens.

Example 16 includes the computer-readable medium of any one of examples 14 to 15, including or excluding optional features. In this example, the computer-readable medium includes instructions that direct the one or more processors to: detect whether a user of the handheld electronic device is walking; activate the head down warning system if the user is walking; and deactivating the head down warning system if the user is not walking.

Example 17 includes the computer-readable medium of any one of examples 14 to 16, including or excluding optional features. In this example, the computer-readable medium includes instructions that direct the one or more processors to determine whether a user of the handheld electronic device is walking and determine a field of interest for the images received from the depth cameras based on whether the user of the handheld electronic device is walking. Optionally, if the user is not walking, the field of interest is selected to be normal to the surface of the handheld electronic device opposite the display. Optionally, if the user is walking, the field of interest is selected to be toward an edge of a field of view of the depth cameras and in a forward-facing direction.

Example 18 includes the computer-readable medium of any one of examples 14 to 17, including or excluding optional features. In this example, the computer-readable medium includes instructions to direct the one or more processors to generate a dewarped image from the images received the depth cameras, wherein the instructions that direct the one or more processors to render the warning on the display direct the one or more processors to render the dewarped image on the display. Optionally, the instructions to direct the processor to generate the dewarped image apply a dewarping function that is determined based on predetermined magnification characteristics of the lenses of the depth cameras.

Example 19 includes the computer-readable medium of any one of examples 14 to 18, including or excluding optional features. In this example, the handheld electronic device is a smartphone.

Example 20 is an apparatus with a head down warning system. The apparatus includes means for receiving images from a pair of depth detection cameras disposed on a surface of the apparatus opposite a display screen of the apparatus, wherein the pair of depth detection cameras include panoramic lenses. The apparatus also includes means for processing the images to identify a hazard and means for rendering a warning on the display to alert a user of the apparatus about the hazard.

Example 21 includes the apparatus of example 20, including or excluding optional features. In this example, the panoramic lenses are panamorphic lenses that provide increased magnification at an edge of a field of view of each of the depth detection cameras. Optionally, a magnification profile of the panamorphic lenses provide an increased image point distribution at a center region of the field of view and the edge of the field of view compared to a linear panoramic lens.

Example 22 includes the apparatus of any one of examples 20 to 21, including or excluding optional features. In this example, the apparatus includes means for detecting whether a user of the apparatus is walking, means for activating the head down warning system if the user is walking, and means for deactivating the head down warning system if the user is not walking.

Example 23 includes the apparatus of any one of examples 20 to 22, including or excluding optional features. In this example, the apparatus includes means for detecting whether a user of the handheld electronic device is walking and determining a field of interest for the images received from the depth cameras based on whether the user of the apparatus is walking. Optionally, if the user is not walking, the field of interest is selected to be normal to the surface of the apparatus opposite the display. Optionally, if the user is walking, the field of interest is selected to be toward an edge of a field of view of the depth cameras and in a forward-facing direction.

Example 24 includes the apparatus of any one of examples 20 to 23, including or excluding optional features. In this example, the means for rendering the warning on the display render the dewarped image on the display. Optionally, the means for generating the dewarped image apply a dewarping function that is determined based on predetermined magnification characteristics of the lenses of the depth cameras.

Example 25 includes the apparatus of any one of examples 20 to 24, including or excluding optional features. In this example, the apparatus is a smartphone.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A handheld electronic device with a head down warning system, comprising:
    a display;
    a depth detection unit disposed on a surface of the handheld electronic device opposite the display, the depth detection unit comprising a pair of cameras with panoramic lenses; and
    one or more processors that receive distance information from the depth detection unit, process the distance information to detect a hazard, and render a warning on the display to alert a user of the handheld electronic device about the hazard.

2. The handheld electronic device of claim 1, wherein the panoramic lenses are panamorphic lenses that provide increased magnification at an edge of a field of view of each of the cameras.

3. The handheld electronic device of claim 2, wherein a magnification profile of the panamorphic lenses provide an increased image point distribution at a center region of the field of view and the edge of the field of view compared to a linear panoramic lens.

4. The handheld electronic device of claim 1, comprising a motion detection unit that determines whether the user is walking, wherein a walking mode of the electronic device is activated when the user is walking and a stationary mode of the electronic device is activated when the user is not walking.

5. The handheld electronic device of claim 1, comprising a motion detection unit that detects whether a user of the handheld electronic device walking, and wherein the processor determines a field of interest for the images received from the depth detection unit based on input from the motion detection unit.

6. The handheld electronic device of claim 5, wherein if the user is not walking, the field of interest is selected to be normal to the surface of the handheld electronic device opposite the display.

7. The handheld electronic device of claim 5, wherein if the user is walking, the field of interest is selected to be toward an edge of a field of view of the pair of cameras and in a forward-facing direction.

8. The handheld electronic device of claim 1, wherein one of the one or more processors receives images from the depth detection unit and the images are used to render the warning on the display.

9. The handheld electronic device of claim 8, wherein the images are dewarped by one of the one or more processors using a dewarping function that is determined based on predetermined magnification characteristics of the lens.

10. The handheld electronic device of claim 1, wherein the handheld electronic device is a smartphone.

11. A method of implementing a head down warning system in a hand-held electronic device with a display, comprising:
    receiving images from a pair of depth detection cameras disposed on a surface of the handheld electronic device opposite the display, wherein the pair of depth detection cameras comprise panoramic lenses;
    processing the images to identify a hazard; and
    rendering a warning on the display to alert a user of the handheld electronic device about the hazard.

12. The method of claim 11, wherein the panoramic lenses are panamorphic lenses that provide increased magnification at an edge of a field of view of each of the depth detection cameras.

13. The method of claim 12, wherein a magnification profile of the panamorphic lenses provide an increased image point distribution at a center region of the field of view and the edge of the field of view compared to a linear panoramic lens.

14. The method of claim 11, comprising:
detecting whether a user of the hand-held electronic device is walking;
activating the head down warning system if the user is walking; and
deactivating the head down warning system if the user is not walking.

15. The method of claim 11, comprising detecting whether a user of the hand-held electronic device is walking and determining a field of interest for the images received from the depth cameras based on whether the user of the hand-held electronic device is walking.

16. The method of claim 15, wherein if the user is not walking, the field of interest is selected to be normal to the surface of the handheld electronic device opposite the display.

17. The method of claim 15, wherein if the user is walking, the field of interest is selected to be toward an edge of a field of view of the depth cameras and in a forward-facing direction.

18. The method of claim 11, generating a dewarped image from the images received the depth cameras, wherein rendering the warning on the display comprises rendering the dewarped image on the display.

19. The method of claim 18, wherein generating a dewarped image comprises applying a dewarping function that is determined based on predetermined magnification characteristics of the lenses of the depth cameras.

20. The method of claim 11, wherein the handheld electronic device is a smartphone.

21. A computer-readable medium, comprising instructions to direct one or more processors to implement a head down warning system in a hand-held electronic device with a display, the instructions to direct the one or more processors to:
receive images from a pair of depth detection cameras disposed on a surface of the handheld electronic device opposite the display, wherein the pair of depth detection cameras comprise panoramic lenses;
process the images to identify a hazard; and
render a warning on the display to alert a user of the handheld electronic device about the hazard.

22. The computer-readable medium of claim 21, wherein the panoramic lenses are panamorphic lenses that provide increased magnification at an edge of a field of view of each of the depth detection cameras.

23. The computer-readable medium of claim 22, wherein a magnification profile of the panamorphic lenses provide an increased image point distribution at a center region of the field of view and the edge of the field of view compared to a linear panoramic lens.

24. The computer-readable medium of claim 21, comprising instructions that direct the one or more processor to:
detect whether a user of the hand-held electronic device is walking;
activate the head down warning system if the user is walking; and
deactivating the head down warning system if the user is not walking.

25. The computer-readable medium of claim 21, comprising instructions that direct the one or more processors to determine whether a user of the hand-held electronic device is walking and determine a field of interest for the images received from the depth cameras based on whether the user of the hand-held electronic device is walking.

* * * * *